(12) United States Patent
Low et al.

(10) Patent No.: US 7,590,173 B2
(45) Date of Patent: Sep. 15, 2009

(54) SYSTEM AND METHOD FOR PERFORMING ADAPTIVE PHASE EQUALIZATION

(75) Inventors: Timothy D. Low, Beaverton, OR (US); Matthew T. Coe, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 11/169,569

(22) Filed: Jun. 30, 2005

(65) Prior Publication Data

US 2007/0002941 A1    Jan. 4, 2007

(51) Int. Cl.
*H03H 7/40*    (2006.01)
(52) U.S. Cl. ...................................... 375/229
(58) Field of Classification Search ................. 375/226, 375/229–230, 257, 285, 356, 362, 371; 370/503, 370/516, 522; 327/276–277
See application file for complete search history.

(56) References Cited

U.S. PATENT DOCUMENTS

| | | | |
|---|---|---|---|
| 4,730,343 A * | 3/1988 | Kanemasa et al. .......... | 375/233 |
| 5,251,210 A * | 10/1993 | Mann et al. ................. | 370/519 |
| 5,408,640 A | 4/1995 | MacIntyre et al. .......... | 395/550 |
| 6,691,214 B1 * | 2/2004 | Li et al. ...................... | 711/167 |
| 7,174,501 B2 * | 2/2007 | Fujiwara .................... | 714/795 |
| 2001/0024136 A1 * | 9/2001 | Yamada ...................... | 327/276 |
| 2004/0172570 A1 * | 9/2004 | Miyajiri ...................... | 713/400 |
| 2006/0023825 A1 * | 2/2006 | Kato et al. .................. | 375/372 |
| 2006/0224342 A1 * | 10/2006 | Greeff et al. ................ | 702/79 |

FOREIGN PATENT DOCUMENTS

| EP | 0 757 462 A2 | 2/1997 |
|---|---|---|
| WO | WO 02/065687 A1 | 8/2002 |

OTHER PUBLICATIONS

International Search Report and Written Opinion dated Nov. 20, 2006.

* cited by examiner

*Primary Examiner*—Khanh C Tran
(74) *Attorney, Agent, or Firm*—Ked & Associates LLP

(57) ABSTRACT

An equalization circuit includes a detector to detect at least one bit pattern on a signal line and a transmit offset circuit to determine a phase-shift setting corresponding to the bit pattern detected by the detector. The phase-shift setting controls a delay in transmission of data on the signal line that suppresses noise including but not limited to inter-symbol interference.

36 Claims, 13 Drawing Sheets

SYSTEM AND METHOD FOR PERFORMING ADAPTIVE PHASE EQUALIZATION

FIELD

This invention relates in at least some of its embodiments to an equalization circuit for suppressing noise on data lines.

BACKGROUND

Buffer circuits (e.g., input/output (I/O) buffers) are widely used to facilitate the transfer of data from one component to another within a system. For example, a microprocessor may use a buffer (driver) to transmit data to and receive data from other components (such as a memory or chipset) via buses.

The performance of a bus buffer is typically characterized by the amount of delay between the time a clock signal is applied to an input of the buffer and the time valid data is provided at an output of the buffer. This delay time is referred to as time from clock to output, or TCO. Generally speaking, if TCO is too long, the system operating frequency may be reduced to allow time for the output to arrive at a receiving end of the bus. On the other hand, if the delay is too short, the output may arrive too quickly. TCO variations, therefore, must be controlled to remain between two limits, i.e., within a TCO window.

The size of the TCO window may be limited by the presence of noise, and especially inter-symbol interference (ISI). As the front-side buses of many microprocessor systems are pushed to faster speeds, timing margins for the bus are reduced. The ISI build-up that results can cause duty cycle mismatches on external signals that vary with different data bit patterns. The resulting mismatches limit the TCO window and thus substantially degrade system performance.

DETAILED DESCRIPTION OF EMBODIMENTS

Figure 1:
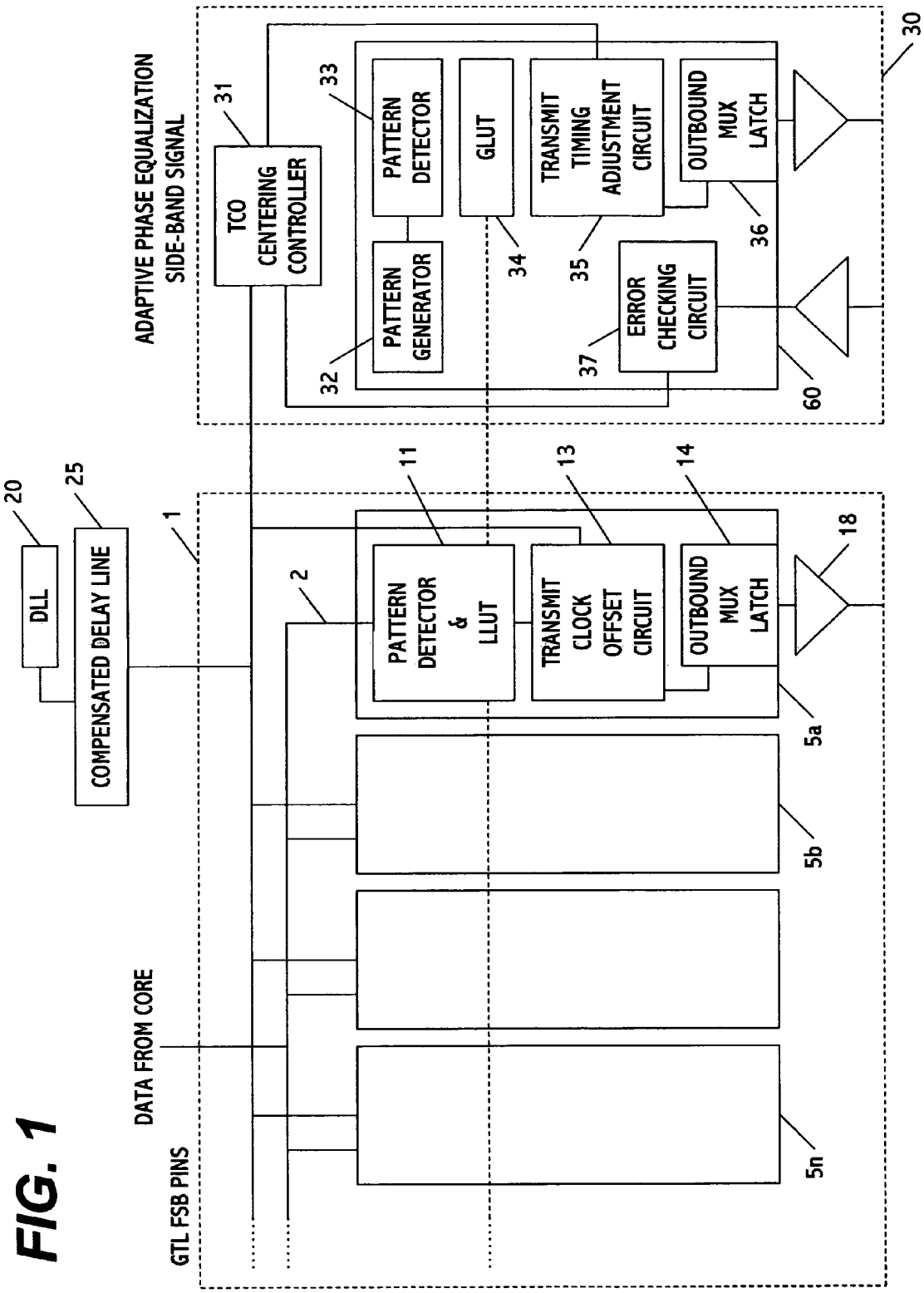
FIG. 1 is a diagram showing a phase equalization circuit in accordance with one embodiment of the present invention.

FIG. 1 shows an input/output (I/O) buffer 1 which transfers data between a component bus 2 and one or more integrated circuits, such as but not limited to the circuits of a microprocessor system. The bus may be a front-side bus having gunning transceiver logic (GTL) pins coupled to the microprocessor at one end and to a core circuit which supplies or receives data at the other end. Other buses are also possible. I/O buffers may be coupled to both ends of the bus, or just one end.

Buffer 1 includes a plurality of equalization circuits $5_a$-$5_n$, each coupled to respective one of a plurality of lines of the bus 2. The equalization circuits perform processing operations (e.g., adaptive phase equalization) which collectively control the timing of data transmitted on and received from the bus. For illustrative purposes, the structure of one equalization circuit is shown with the understanding that the other equalization circuits may have the same or similar structure. In other embodiments, the equalization circuits may differ.

Each phase equalization circuit includes an outbound multiplexer latch 14 and a transmit clock offset timing circuit 13. Data from the core, or otherwise received by or for transmission on the bus, is sent from the latch through analog driver circuitry 18 to a respective one of a plurality of external pins or pads. The latch is controlled by a clock signal which, for example, may originate from a delay-locked loop circuit 20. The clock signal determines when the data is sent through the latch. A compensated delay line 25 may be provided to control the timing of a clock signal edge that controls output of the data from the latch. By controlling the timing of this edge, the data is shifted in time in a way that suppresses noise including but not necessarily limited to inter-symbol interference (ISI).

In accordance with one embodiment, each equalization circuit $5_a$-$5_n$ controls the time shift for a respective one of the pins (or data bits) using a pattern detector and local look-up table 11, which are coupled in tandem to the transmit clock offset timing circuit. The pattern detector detects a bit pattern in the data and the local look-up table stores information which controls the generation of a clock offset signal from circuit 13. The clock offset signal, in turn, controls the transmission timing of data on the bus. Together, circuits 11 through 14 apply phase equalization to the bit data that adaptively compensates for real-time duty-cycle mismatch that causes inter-symbol interference.

More specifically, the adaptive phase equalization is performed by adjusting the phase of the data transferred to (or received from) the bus based on a pattern of bits detected in the data. This phase adjustment reduces the mismatch and suppresses noise (ISI) on the front-side bus transmission lines, thereby allowing for a wider TCO margin window and enhanced system performance. In one illustrative application, this form of equalization may be used to realize both source synchronous and common clock timing optimization.

Figure 2:
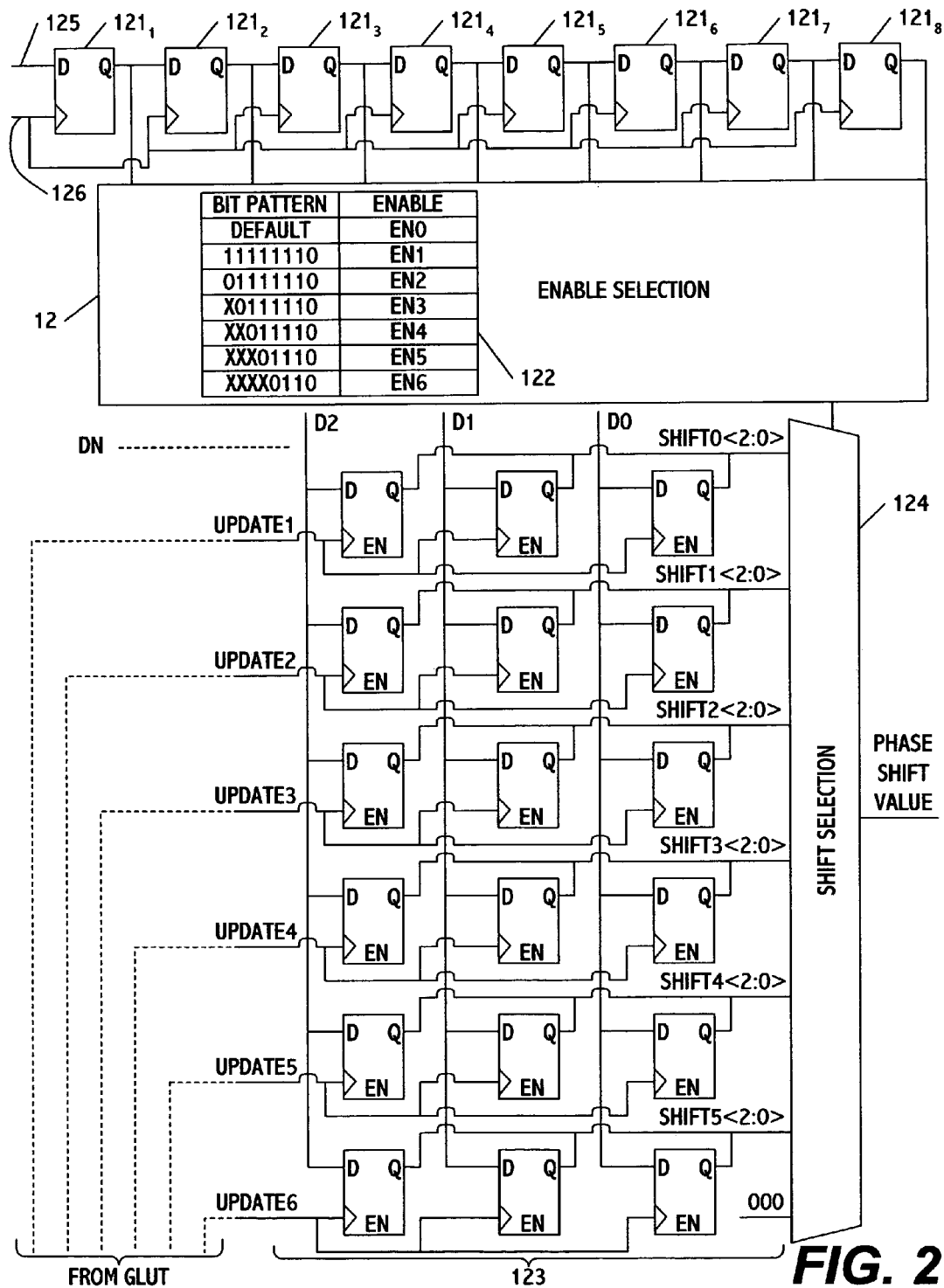
FIG. 2 is a diagram showing one possible implementation of a local look-up table included in a phase equalization circuit.

FIG. 2 shows one possible implementation of the bit pattern detector and local look-up table. This circuit is coupled to or may form part of a bit pattern detector which has eight flip-flops $121_1$-$121_8$ connected in series and which operates in a manner similar to the detector discussed in FIG. 2. Together, the flip-flops store a history of data bits received from a respective one of the bus signal lines. Signal 125 corresponds to the newest bits of the data stream.

The table itself is formed from an enable selection circuit 122 which generates a plurality of enable signals (en0-en6) in association with a respective number of predetermined bit patterns. Detection of the bit patterns may be performed using an array of logic gates having inputs coupled to different combinations of the flip-flop outputs. These logic gates may generate the enable signals in a manner analogous to the AND gates shown in FIG. 2. For example, the enable selection circuit may include seven AND gates having inputs coupled to flip-flop outputs that respectively correspond to the entries in the bit pattern column of the table.

In operation, the data bits are shifted through the chain of flip-flops by a clock signal 126, and the Q outputs of the flip-flops are input into the enable selection circuit. The selection circuit outputs one of the enable selection signals (en0-en6) based on the detected bit pattern. The selection signal, en0, is indicative of a default value with subsequent signals corresponding to the designated bit patterns in the table. While seven enable signals are shown, a different number of enable signals may be generated in alternative embodiments.

The enable selection signal from circuit 122 determines a phase-shift value output from a shift-selection circuit 124; that is, each enable selection signals en1-en6 selects one of a plurality of phase-shift values, Shift0<2:0> to Shift5<2:0>, and default enable selection signal en0 selects default value 000. These values correspond to ones generated by logic circuitry 123, which may be formed from a matrix of flip-flops. The flip-flops in each column of the matrix are coupled to a respective bit of input data, e.g., $D_0, D_1, D_2, \ldots, D_n$. The enable selection signal selects the output of one of these flip-flops for each bit to generate a phase-shift value which corresponds to the output of the local look-up table. Shift-selection circuit 124 may be a multiplexer or some other signal selection circuit.

Figure 3:
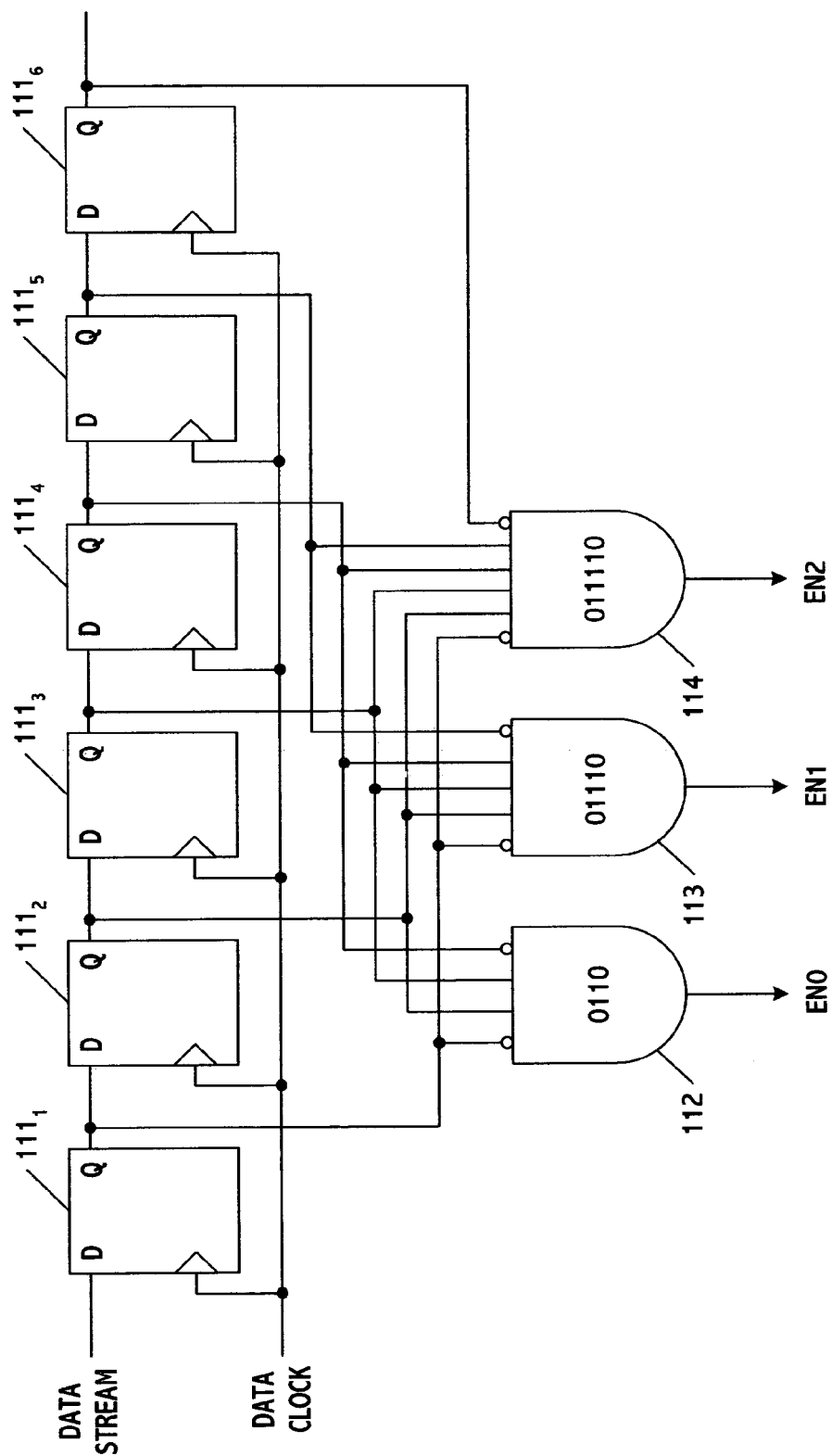
FIG. 3 is a diagram showing a pattern detector for use in a phase equalization circuit.

FIG. 3 shows another possible implementation of the bit pattern detector. This detector includes a chain of flip-flops $111_1$ to $111_n$ and a number of logic gates 112-114 coupled to receive different combinations of outputs of the flip-flops. The flip-flop chain holds a copy of the data bits on the bus for the last n clock cycles. The newest bits of the data stream are received by flip-flop $111_1$, and these bits are shifted in time through the chain based on an input data clock signal. The chain, therefore, effectively operates as a short-term memory for storing a history of bits received on a respective one of the bus lines. In this example, n equals 6 and the logic gates are AND gates. In other embodiments, n may be a number higher or lower than 6 and the AND gates may be replaced or supplemented with other logic circuits.

In operation, logic gates 112-114 search the data to detect predetermined bit patterns received over time. These bit patterns may be ones that are to be phase equalized in accordance with the present embodiment. In this example, three bit patterns are detected: 0110xx, 01110x, and 011110. In other embodiments, different bit patterns and/or different numbers of bit patterns may be detected. Detection of zeros in each bit pattern may result from inverting inputs into the logic gates.

When the patterns are detected, corresponding ones of the logic gates generate enable signals, en0, en1, and en2. These enable signals may each hold a predetermined logical value (e.g., a true or high value) until a new value causing a pattern deviation is clocked into the flip-flop chain. The enable signals control the output of the local look-up table in FIG. 1, e.g., the bit pattern detector filters through the data stream and compares the detected pattern to the local look-up table. The local look-up table, then, generates a phase-shift value based on a result of this comparison.

The local look-up table may be a memory (e.g., RAM) that stores a plurality of predetermined bit patterns in association with a respective number of clock offset values. Because the clock offset values control the timing of the data output, these values produce different phase shifts in the data which, when properly selected, suppress ISI.

Figure 4:
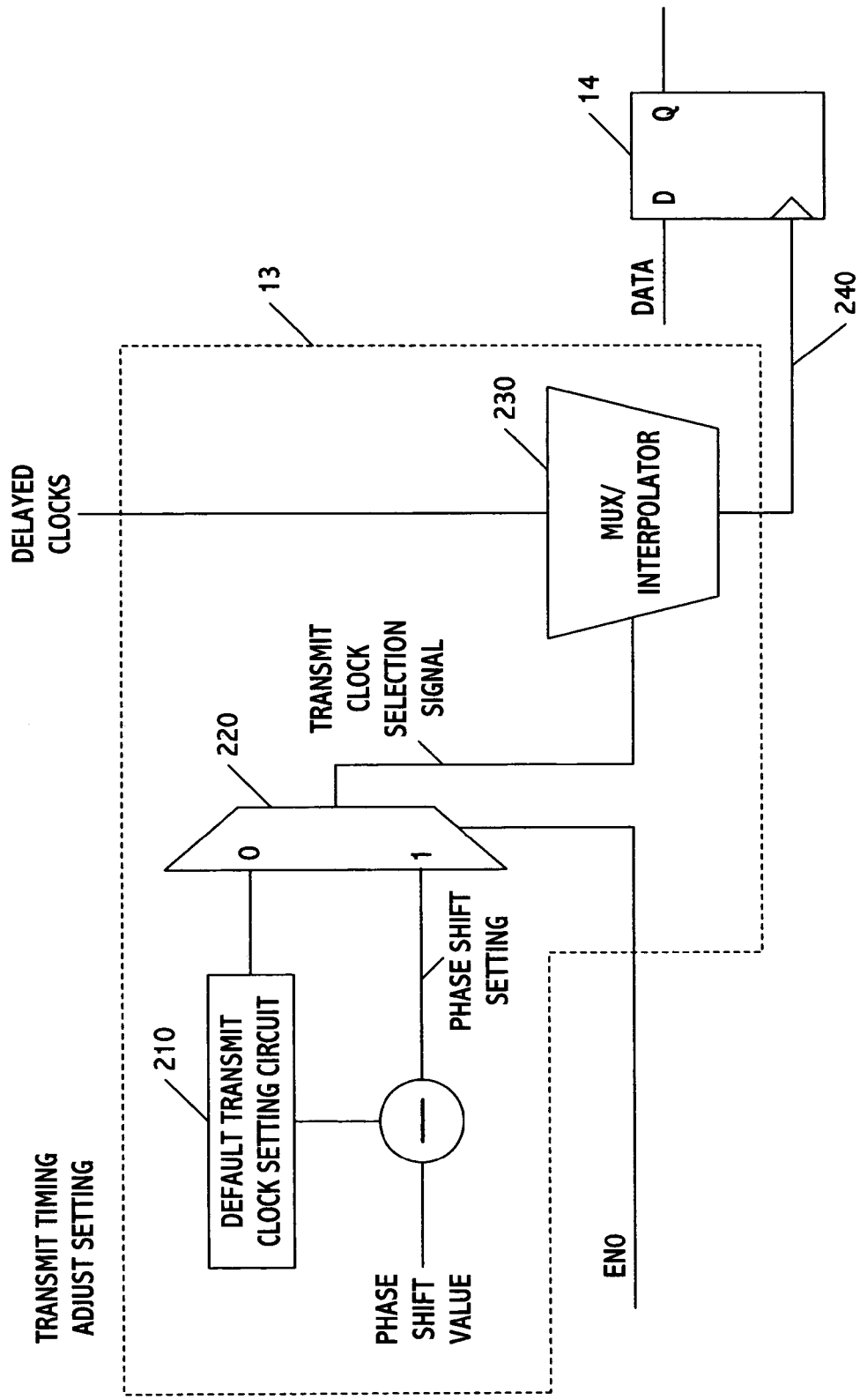
FIG. 4 is a diagram showing one possible implementation of a transmit clock offset circuit included in a phase equalization circuit.

FIG. 4 shows one possible implementation of the transmit clock offset circuit 13. Initially, the clock offset circuit may be selected to correspond to a default setting output from circuit 210, which, for example, may be a register or memory cell. The selection is made by a multiplexer 220 in response to a first value of default enable selection signal en0 output from the look-up table. An adjustment of the setting is made when a phase-shift value is output from circuit 124, shown in FIG. 3. When this occurs, the phase-shift value (e.g., corresponding to a time-shift value) is subtracted from the default clock setting, and the resulting phase-shift setting is selected for output when the logical value of enable selection signal en0 changes to reflect that one of enable selection signals en1-en6 has been output from the local look-up table 122. Alternatively, the phase-shift value from circuit 124 may be passed through multiplexer 220 as the phase-shift setting based on the changed logical value of en0.

The phase-shift setting output from multiplexer 220 is used to select which one of the plurality of delayed clock values from compensated delay line 25 are to be transferred through multiplexer/interpolator 230. The delayed value is used as a clock signal 240 for adjusting the time offset, and thus the phase-shift, of a respective one of the data bits output from outbound multiplexer latch 14.

Returning to FIG. 1, a global adaptive phase equalization circuit 30 may be used to control the clock offset values in the equalization circuits for all or a portion of the data bits. Circuit 30 performs this function adaptively based on detection of a signal received on a side-band pin of the data bus. This side-band pin may cycle through one or more pre-programmed (e.g., test) patterns that model ISI build-up across all or a portion of the data pins. In performing this function, the side-band pin may operate like the other GTL pins except that equalization circuit 30 may calculate an intended or optimal transmit timing offset which cancels ISI effects in the bus data. The patterns may be fixed-length patterns, variable-length patterns, or a combination of both.

The global equalization circuit includes a TCO centering controller 31, a pattern generator 32, a pattern detector 33, a global look-up table 34, a transmit timing adjust circuit 35, and an outbound multiplexer latch 36. An error-checking circuit 37 may also be included for performing error detection and correction for data bits received by the side-band pin, e.g., in data receive mode. The TCO centering controller makes corresponding adjustments in the TCO window based on results output from the error checking circuit.

Figure 5:
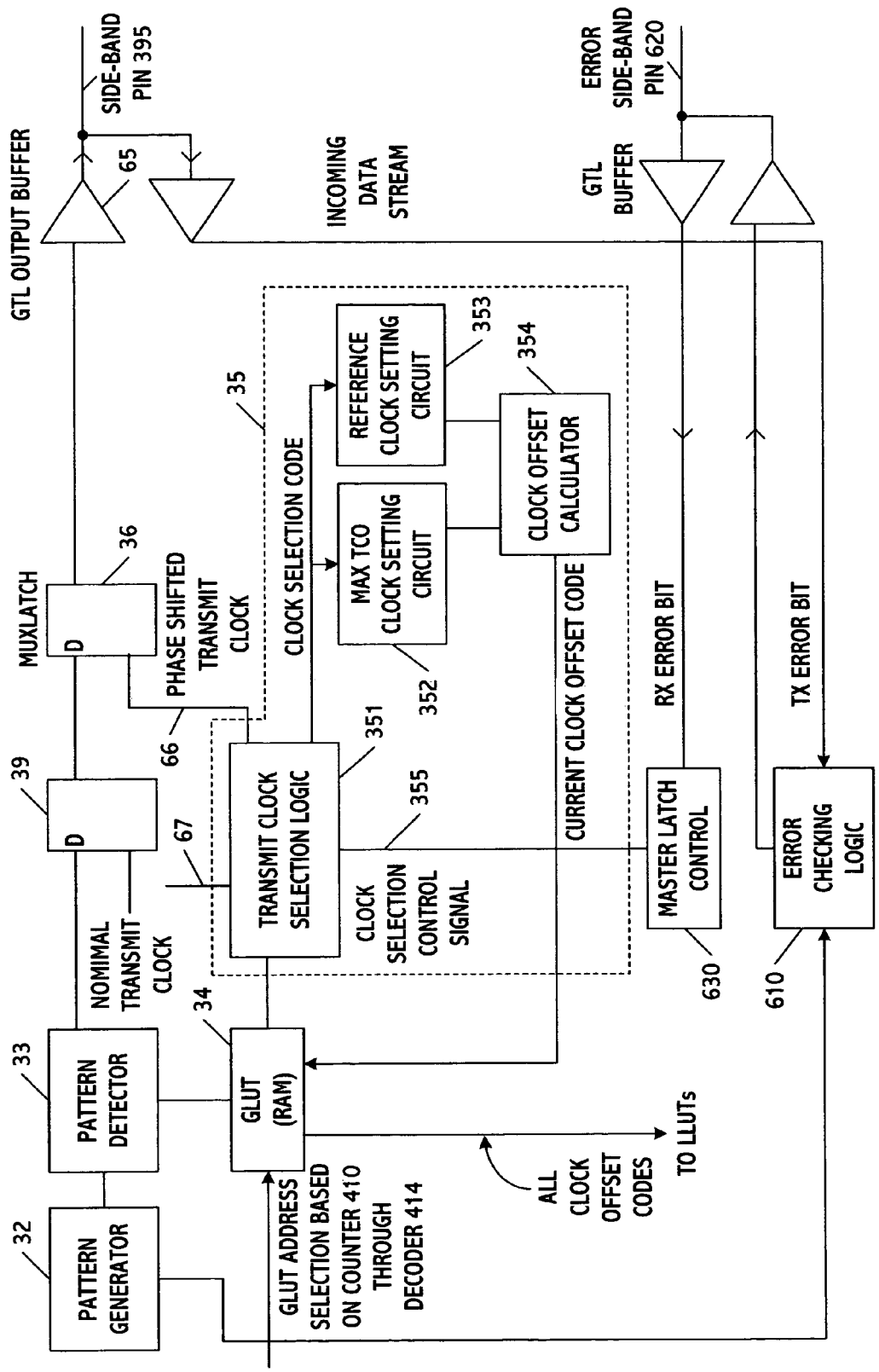
FIG. 5 is a diagram showing a phase equalization circuit for a side-band pin shown in FIG. 1.

FIG. 5 shows one possible implementation of the transmit timing adjust circuit. This circuit includes transmit clock selection logic 351, a maximum TCO clock setting circuit 352, a reference clock setting circuit 353, and a clock offset calculator 354. In operation, pattern generator 32 generates one or more pre-programmed (e.g., test) bit patterns. These patterns may model ISI build-up across one or more of the data pins. Examples of these patterns are listed below:

000001
100001
X10001
XX1001
XXX101

In this pattern, the variable "X" is used to represent any bit value. In alternative embodiments, different predetermined patterns may be used for modeling ISI build-up or for modeling other features of interest.

The global look-up table (GLUT) transmits phase-shift values to respective ones of the local look-up tables (LLUTs) in equalization circuits $5_a$-$5_n$. In accordance with one embodiment, these phase-shift values may correspond to clock offset codes. Initially, the GLUT transmits predetermined or default codes to the LLUTs. These codes are then adjusted based on the output of the transmit timing adjust circuit. More specifically, transmit clock selection logic 351 outputs a clock selection code in the GLUT based on a clock selection control signal 355. The clock selection code, and indeed all the codes stored in the GLUT, may correspond to phase-shift values.

Clock setting circuit 352 includes a register which may hold the absolute clock select value corresponding to the maximum TCO margin condition for the current pattern being applied. TCO (time from clock to out) may represent the time that elapses between when the transmit clock edge occurs and when the data being clocked out appears on the external bus. This time, thus, provides a metric indicating a deviation (or margin) from an ideal or intended timing of a signal transmission on the bus. Put differently, TCO margin may represent the difference between the actual timing of the signal transition on the bus and the time where a setup or hold violation will occur at the receiver. The TCO margin, thus, may be used as a basis for determining margin failure.

The side-band circuits provide a measurement of this margin. By tracking clock settings which cause read failures at the receiver (both early and late failures may be recorded), the clock setting closest to the ideal or an intended transmit timing may be calculated from the standpoint of the receiver. As will be explained in greater detail, the side-band pin of the receiver checks the data on the bus against the pattern known to be transmitted. Feedback regarding the data integrity of the side-band pin may then be returned to the transmitter on the handshake pin.

Reference clock setting circuit 353 includes a register which holds a reference clock setting. This clock setting value may be the clock setting before phase equalization is applied, and accordingly may be referred to as the default clock setting. Circuit 353, thus, outputs a signal indicative of the clock setting used to transmit data with no phase equalization.

Clock offset calculator 354 may calculate the clock offset by subtracting the Max TCO margin clock setting held in register 352 from the reference clock setting held in register 353. The resulting signal forms a clock offset code (e.g., a digital signal) which represents the magnitude of a clock shift value relative to the reference (or default) clock setting for a given phase shift. Put differently, the code which results from this subtraction operation generates a representation of the offset from the default clock which may help to achieve a maximum TCO margin. The GLUT stores the current clock offset code in a register whose address is determined by the bit pattern currently being transmitted by the side-band pin. This code and the other codes stored and output from the GLUT may correspond to phase-shift settings.

Once generated, each bit pattern is input into the pattern detector. The pattern detector then outputs bit pattern as an output data stream, and may also output phase-shift enable and reference centering signals. The output data stream path may be arranged as follows.

The bit pattern from generator 32 may be sent to latch 39 through the pattern detector. Latch 39 outputs this pattern to muxlatch 36, and in so doing captures a set-up timing requirement used to model the core-to-I/O timing. The pattern from latch 39 may be output based on a nominal transmit clock signal 67 from clock selection logic 351, and muxlatch 36 may output this pattern based on a phase-shifted transmit clock signal 66 also output from logic 351. The output of the muxlatch is then transmitted on side-band pin 395 through GTL buffer 65.

Figure 6A:
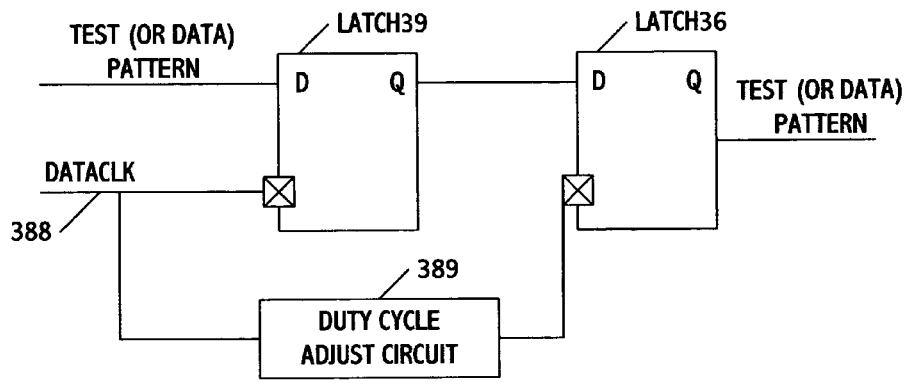
FIG. 6A is a diagram showing one type of circuit for capturing a set-up timing requirement for the phase equalization circuit of FIG. 5.

FIG. 6A shows an example of how the set-up timing requirement may be captured by latch 39. In the GTL bus protocol, the test (or data) pattern from detector 33 may be flopped before it is transmitted through the GTL buffer. The flop may be performed by p-latch 39 and n-latch (master and slave). While passing through the latches, the data may be transmitted off an edge (e.g., the falling edge) of the data clock signal 388, which may correspond to the nominal clock signal shown in FIG. 5. A duty cycle adjust circuit 389 may adjust the duty cycle of this clock signal to control when the data pattern is transmitted onto the GTL buffer. Circuit 389 may be included in or correspond to transmit clock selection logic 351.

Figure 6B:
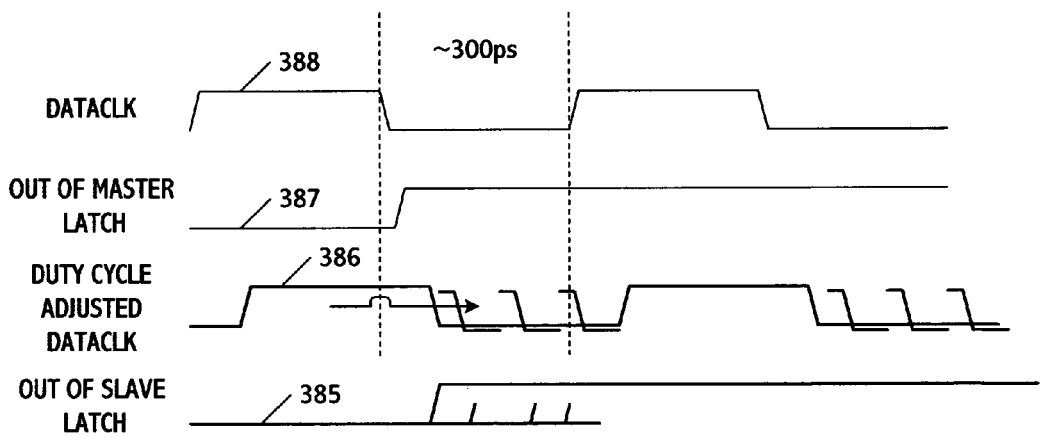
FIG. 6B is a graph showing timing waveforms that may be used to capture the set-up timing requirement.

FIG. 6B shows a timing diagram of how transmitting data may be pushed or pulled through adjustment of the clock duty cycle. In this diagram, Dataclk corresponds to the transmitting clock signal 388, signal 387 corresponds to the output of the master latch (e.g., latch 39), signal 386 corresponds to the adjusted duty cycle of clock signal 388 output from circuit 389, and signal 385 corresponds to the output of the slave latch (e.g., latch 36). As shown, the adjustments made by circuit 389 may push or pull the position of the falling edge of the data clock signal 388 to achieve an intended set-up timing requirement. This requirement may be set, for example, to correspond to a time which data must arrive at latch 39 before corruption occurs.

As indicted, latch 36 shifts the data output from flip-flop 39 for transmission on the side-band pin through GTL output buffer 65 based on phase-shifted transmit clock signal 66 output from logic circuit 351. Signal 66 may be one of the clock signals output from clock selection logic circuit 351, and may be selected by clock selection signal 355. Clock signal 355 may be independently generated or may correspond to clock select signal 501 ultimately used to determine the phase-shifted output of multiplexer 540. (See FIG. 8). Latch 36 delays the output of the data output from flip-flop 39 based on the phase-shifted transmit clock signal, and the result is transmitted to the side-band pin through the GTL output buffer.

Referring again to FIG. 5, the GLUT stores each of the outputs from the clock offset calculator 354 corresponding, for example, to different ISI conditions on the bus. When the GLUT has been completely updated with a full set of clock offset codes (e.g., phase-shift settings), which may occur when pattern generator 32 has generated all of its output test patterns and clock offset values have been generated for each of these test patterns, the codes are transmitted from the GLUT to the local look-up tables in each of circuits $5_a$-$5_n$. The local look-up tables then output phase-shift settings (e.g., from circuit 124 in FIG. 3) based on the newly received codes from the GLUT. These new codes may help to achieve optimum clock offset values corresponding to the different bit patterns that are detected on the data bus lines.

Figure 7:
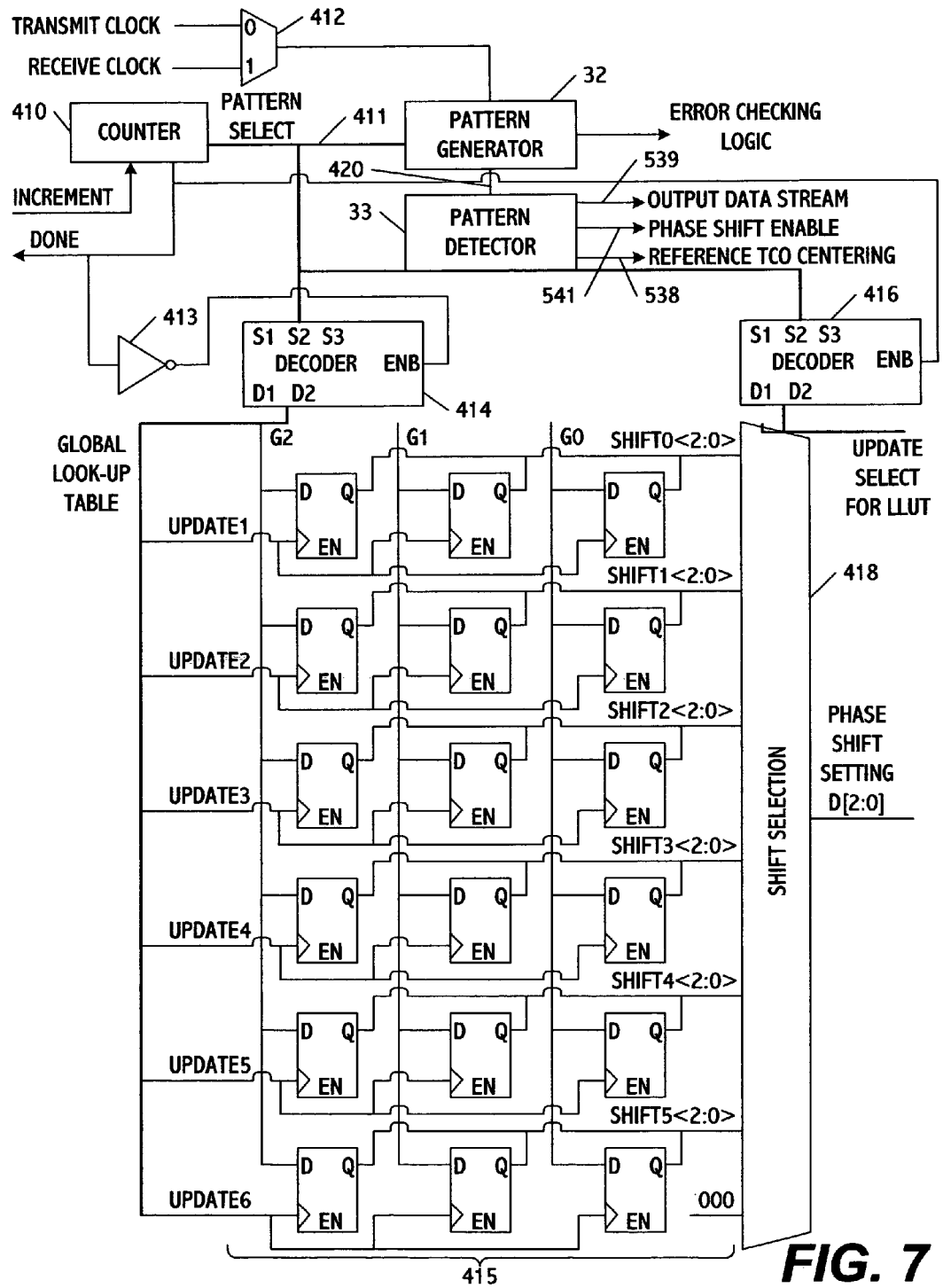
FIG. 7 is a diagram showing a more detailed view of the phase equalization circuit for the side-band pin.

FIG. 7 shows a more detailed view of circuits that may be used in one implementation of the phase equalization circuit for the side-band pin. In this view, during transmit mode, a counter 410 is sequentially incremented to select a pattern of interest, which, in turn, enables a corresponding entry in the GLUT to be edited, overwritten, or updated. The increment signal may be generated from any one of a variety of circuits including but not limited to a finite state machine.

The counter outputs a pattern select signal 411, which causes the pattern generator to select one of a plurality of pre-programmed test patterns. The pattern generator may be a decoder programmed to output a given one of the test patterns in response to each counter code. A two-bit counter may help allow four patterns to be optimized, a three-bit counter may help allow eight patterns to be optimized, and so on. The logic may be scaled according to the number of specific patterns to be equalized for successful transmission.

Multiplexer 412 receives a transmit clock signal and a receive clock signal. The transmit clock signal is received when the side-band pin is to transmit data on the bus, and the receive clock signal is received when the side-band pin is to receive data on the bus. This may allow both bus agents to determine independent phase equalization values.

Pattern generator 32 updates the output pattern in response to the clock signal output from multiplexer 412. This may involve outputting the next stored test pattern of a plurality of pre-programmed test patterns. The pattern generator may also send the test pattern to a separate error checking logic circuit, e.g., circuit 37. This circuit compares the pattern to incoming input/output (I/O) data, and then checks to see that the receiver did indeed receive the intended pattern.

The counter outputs a "done" signal when all the pre-programmed patterns have been tested and the GLUT has been updated with settings produced from the test patterns. Prior to generation of the done signal, the value of the done signal is not true. As a result, the GLUT is enabled and entries can be updated. During this time, the output of the GLUT may be disabled. The counter, then, counts through all the test patterns and updates the GLUT with entries produced from the test patterns. When finished, the done signal becomes true, the GLUT input is disabled, and the GLUT output is enabled. When the counter cycles through all values a second time (with the done signal being a true value, the GLUT outputs its entries to update the local look-up tables provided in the equalization circuit for each data bus line.

The done signal is inverted by an inverter 413, and this inverted signal serves as an enable input into a decoder 414. This decoder may be an n-to-$2^n$ decoder with enable. When the "done" signal is not true, meaning that the GLUT is currently being updated, each n-bit counter value is decoded to a single bit enable signal which enables an address in the GLUT. In the example given in FIG. 7, each three-bit counter code may be mapped to an entry in the GLUT. Also, in this example, only six of a possible eight codes are used. As the counter steps through the test patterns, the corresponding address in the GLUT is enabled. At the end of the test cycle, the optimum clock setting value is stored in the enabled flops.

In this exemplary implementation, GLUT matrix 415 may include a column of D flip-flops for each bit of side-band data G0-G2. G2 represents the most significant clock setting bit, and G0 represents the least significant clock setting bit. Each row of flip-flops in the matrix holds the optimum phase-shift setting for the data pattern represented by the update signal connected to each of the three flops in each row of the GLUT. Each row in the GLUT corresponds to the three-bit clock offset setting determined to be optimum for the pattern under test at the time.

The pattern select signal 411 from counter 410 is also sent to a decoder 416, which generates a selection signal which selects one of the shift values output from the GLUT matrix. The output of multiplexer 418 is sent to the local look-up tables along with the output of decoder 416. This allows the LLUTs to be updated with the information in the GLUT, once the GLUT is completely updated.

Signal 420 output from the pattern generator 32 is input into the pattern detector 33. Signal 420 may be a serialized test pattern output from the pattern generator. The pattern detector may also generate various enable signals based on which pattern is detected. The output data stream may simply be, for example, signal 420 repeated to the output buffer. The phase shift-enable signal may be asserted when a pre-programmed pattern has been detected. These operations may be explained in greater detail, for example, in the following manner.

Initially, counter 410 selects the GLUT address to be updated and the test pattern based on pattern select signal 411. The pattern may then be serially transmitted through the pattern detector as the data stream 539 for transmission along the GTL output data path, e.g., a side-band pin. The pattern may be temporarily buffered in the pattern detector during this time. Once the full (e.g., six-bit) test pattern is loaded into the pattern detector, phase shift enable signal 541 may be asserted. Transmission of the output data stream and buffering of the test pattern in the pattern detector may be performed in parallel. In this embodiment, phase equalization may then be performed only on the least significant bit, and the remaining bits may be provide for modeling ISI effects. Also, a reference TCO signal 538 may be asserted during cycles when a pre-programmed pattern has not been detected, or when the adaptive phase equalization feature has been disabled.

Further, in this or alternative embodiments, counter 410 may control the selection of the correct entry in the GLUT for update based on feedback from a receiver located at an opposing end of the bus line connected to the side-band pin. Returning to FIG. 5, the feedback may be generated in response to the test pattern transmitted on side-band pin 395 through GTL output buffer 65. At a receiving end of the bus, a circuit similar to circuit 30 may be provided. This circuit receives the transmitted test pattern through a complementary side-band pin and compares the test pattern to one or more test patterns in its own pattern generator, stored, for example, in its own global look-up table.

The compare circuit may correspond to error checking logic 610 as also shown in FIG. 5. Based on a result of this comparison, logic 610 generates a pass or fail bit to be sent as feedback to the transmission side of the bus. The pass or fail bit may be received through an error side-band pin 620, and input into a master latch control circuit 630 for determining, for example, the TCO margin boundary. (The error bit may also referred to as a receiver (Rx) error bit; see also FIG. 10.) As described in greater detail below, determination of the TCO margin boundary may involve continuously performing a phase shift on the least significant bit of the pattern bit until a maximum or other intended TCO window is achieved.

Figure 8:
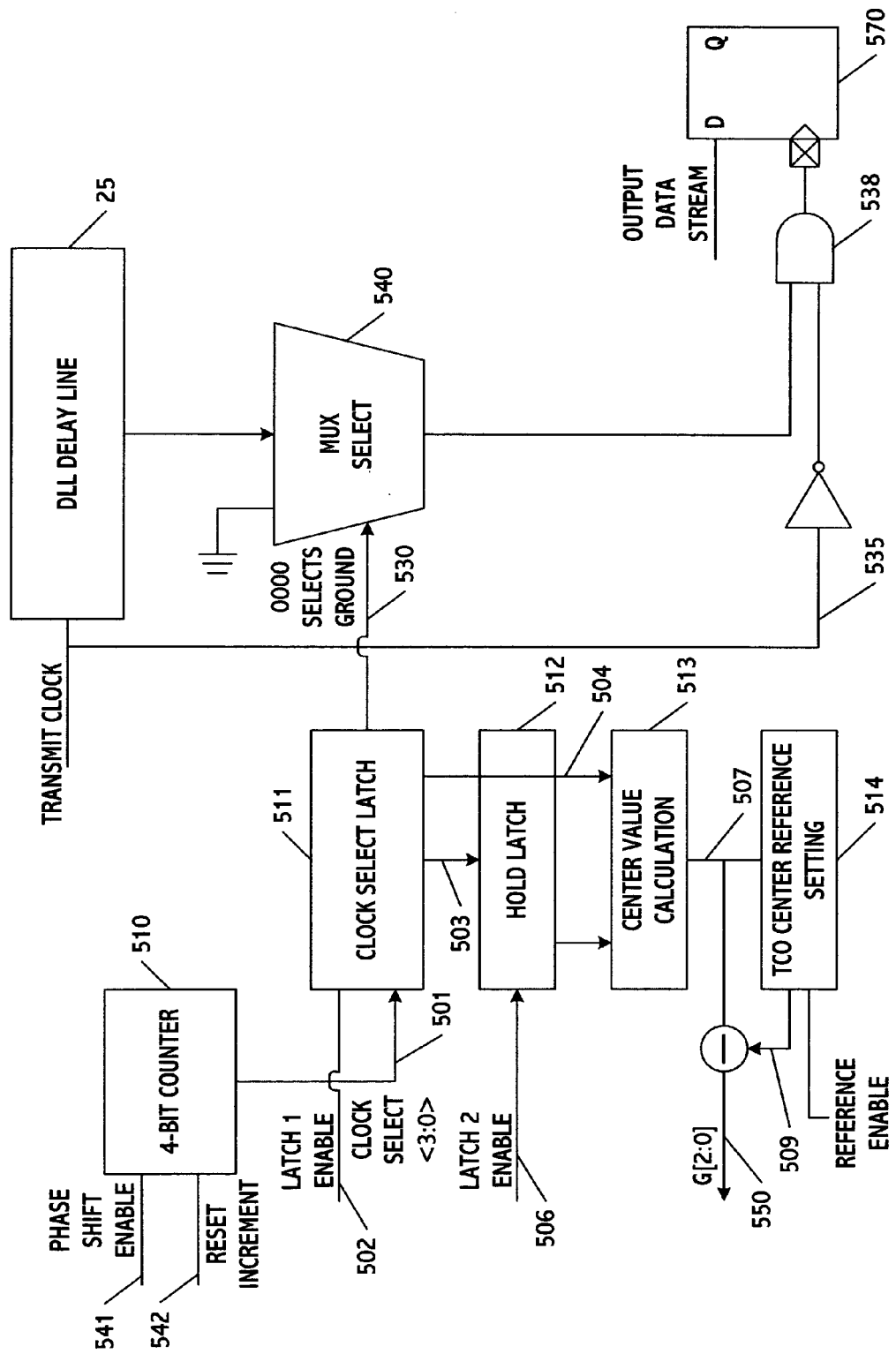
FIG. 8 is a diagram showing one possible implementation of a TCO centering logic circuit included in the side-band pin equalization circuit.
Figure 9:
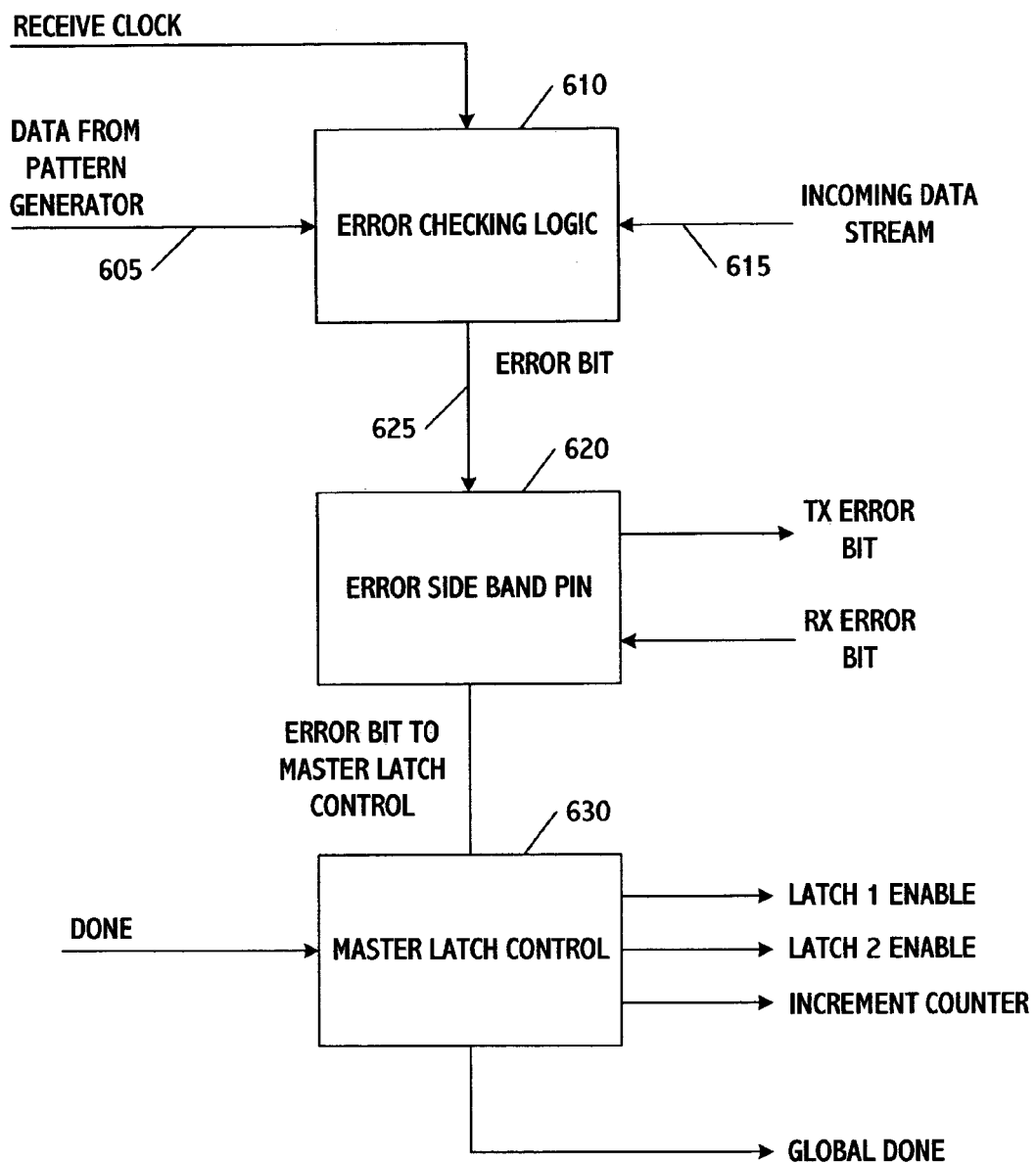
FIG. 9 is a diagram showing an implementation of the side-band pin equalization circuit used in a receive mode.

FIGS. 8 and 9 collectively show one way in which the increment counter procedure may be performed based on the error bit value on the receiver path. According to this procedure, a pass-fail condition may mark one end boundary of the TCO window. A finite state machine may be a centering control machine which steps through each possible clock setting, while transmitting each of the predetermined patterns on the side-band pin. When the optimum clock setting is determined for the pattern under test, the counter will be incremented, causing it to output the next predetermined pattern for test.

One possible implementation of the TCO centering controller 31 is shown in FIG. 8, which also may be relied on to indicate how this circuit adjusts clock offset values in equalization circuits $5_a$-$5_n$. Controller 31 may be a logic circuit that snoops an error bit handshake that occurs between transmitting and receiving sides of the bus. The controller may include or be coupled to a counter 510, a clock select latch 511, a hold latch 512, a center value calculator 513, and a TCO center reference setting circuit 514.

Counter 510 is an n-bit counter (e.g., n=4) which receives a phase-shift enable signal 541 and a counter increment signal 542, both of which may be generated by the finite state machine controlling the TCO window centering process. The centering process is implemented as a testing procedure. During this procedure, the phase-shift enable signal enables the counter to cycle through a predetermined set of clock select values. Each value is output as a clock select signal 501, which, for example, corresponds to a 4-bit phase-shift value represented by "clock select <3:0>" The 4-bit representation allows signal 501 to assume one of $2^4$=16 different phase shift values. The value of signal 501 may be updated to a next value when the counter increment signal is asserted. Clock select latch 511 stores the clock select value of the signal 501 when enabled by latch enable signal 502 during each step of the cycle, which may also be generated by the finite state machine.

More specifically, during testing, the finite state machine cycles through a predetermined set of phase-shift values. Assuming that the range of possible phase-shift values is greater than the range of phase-shift values that allow proper operation of the bus, feedback from the side-band error pin produces a subset of phase-shift values which result in the correct data being received by an agent coupled to a receiving side of the bus. This agent may have the same structure as shown in FIG. 1.

The subset of valid phase-shift values may correspond to the "passing window." As the test is carried out, latch 512 holds a first window edge while latch 511 continues to look for a second window edge. Once both extreme passing values are obtained, the center value of the window is calculated by the window center calculator 513. In accordance with one embodiment, nominal transmit clock signal 67 may control output of signal 530 from clock select latch 511. This process will now be explained in greater detail. (As previously indicated, in accordance with at least one embodiment, a "passing value" is determined based on a comparison of the received data pattern and the patterns from the pattern generator. The result is then fed back into the error side-band pin as, for example, a logic-low signal for passing and a logic-high signal for failure.)

Clock select latch 511 inputs two signals, 503 and 504, into hold latch 512 and center value calculator 513 respectively. The hold latch stores a lower bound of the passing clock select setting which corresponds to one edge of the TCO window; that is, latch 512 stores the value of signal 503 (e.g., the current value of latch 511) when feedback from the side-band pin indicates that the lower bound of the passing window has been detected. This frees up clock select latch 511 to continue on looking for an upper bound of the passing clock select setting, which corresponds to a second edge of the TCO window.

Once the upper bound is found, the center value calculator 513 uses the upper bound information stored in latch 511 and the lower bound information stored in latch 512 to calculate the center of the passing window. In one embodiment, the upper and lower bounds may define an maximum TCO window. The center value calculator may then calculate the clock select value closest to the center of the range defined by the clock select values stored in latch 511 and 512, which correspond to the upper and lower bound of the passing operation region respectively. This calculation may be performed, for example, by adding the upper and lower bounds and then dividing by two. In alternative embodiments, a different approach may be used to calculate the center value.

Latch enable signal 506 may be generated by the finite state machine. The timing of latch enable signals 502 and 506 may be as follows. Latch enable signal 502 may be asserted every time the counter is incremented, so that the new value can get loaded into the register. Latch enable signal 506 may be asserted when the first passing data pattern on the side-band signal is detected, to store the clock select value that yielded the first passing data pattern on the bus.

The center value calculator 513 generates a signal 507 which is input into TCO center reference setting circuit 514. Signal 507 may represent an optimal or other clock setting value. This value may be subtracted from the reference setting stored in latch 514 to yield the clock offset from the reference setting for maximum TCO margin (signal 550).

The reference setting circuit 514 may perform two functions depending on the type of system that uses the phase equalization circuitry. In one implementation, circuit 514 may be a read-only memory (ROM) programmed with a default clock value determined from system simulation and testing. In this implementation, signal 507 may be ignored and the signal "reference enable" may not used.

Another (e.g., higher performance implementation) may include a basic calibration cycle which runs to determine an exact optimum clock setting for each data buffer, without the presence of ISI on signal traces. After the calibration cycle is completed for each pin of the bus, phase equalization offsets may be applied based on optimum or other clock settings rather than average clock settings. In this case, signal 507 represents the optimum or another clock setting with no ISI for each pin. The storage of the optimum clock setting in this register would be controlled by the signal "reference enable." This reference enable signal may be generated by the TCO centering control logic circuit.

The TCO center reference setting circuit 514 generates a signal 509 which is subtracted from the output of calculator 513. As previously indicated, the resulting difference signal 550, labeled G[2:0], is the clock setting offset from the reference clock setting which yields the greatest TCO margin for a given bit pattern. G[2:0] is the value stored in the GLUT and then later in the LLUTs.

Multiplexer 540 selects one of a plurality of predetermined time delays from DLL delay line 25. This selection is made based on the clock select signal 530 output from latch 511. Select signal 530 may therefore select which of the time delays from DLL line 25 is used to control transfer of the output data stream onto the bus. AND gate 538 logically combines the time delay value 560 output from MUX 540 with an inverted value of a transmit clock signal 535. The resulting signal controls the output of the data stream from flip-flop 570.

FIG. 9 shows one possible implementation of the error checking logic circuit 37 in FIG. 1 used to process data received from the bus through the side-band pin, e.g., during receive mode. This circuit includes an error checking logic unit 610, an error side-band pin 620, and a master latch controller 630. In operation, the error checking logic unit 610 receives data from the pattern generator. This may be the same data pattern that is transmitted out from the driving agent. The receiving agent compares the data received to values obtained from the pattern generator.

Also, in logic unit 610, the incoming data is synchronized with the receiver clock and compared against the pattern generator data. The data should match, and an error bit is generated if they do not. The error bit may be generated, for example, based on an XOR operation on the data patterns.

Once the error bit is generated, it is drive back to the transmitter and into master latch control circuit 630, which, in turn, controls the TCO centering logic. The master latch control circuit receives the "done" signal from counter 410, and then de-asserts the latch 1 enable signal, the latch 2 enable signal, and the increment counter in response. More specifically, when the error bit changes from Pass to Fail, the latch 1 enable signal is de-asserted. When the error bit changes from Fail to Pass, the latch 2 enable signal is de-asserted. And when the error bit changes from Pass to Fail, the increment counter is de-asserted. (The latch 1 enable signal corresponds to signal 502, t latch 2 enable signal corresponds to signal 506.)

The master latch control circuit also generates a "Global Done" signal. This signal indicates that the transmitter agent GLUT is done updating and that the transmitter and receiver agents can now reverse roles. The LLUT is then updated to based on the GLUT output.

Figure 10A:
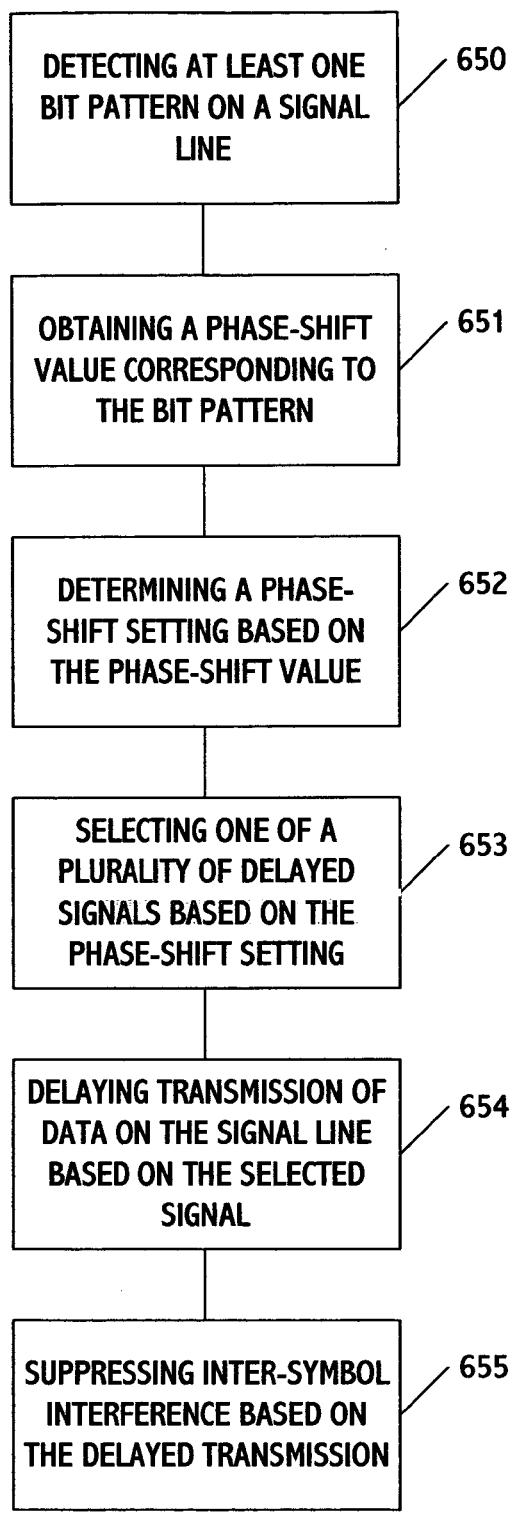
FIG. 10A is a flow chart showing blocks included in a method for performing phase equalization in accordance with one embodiment of the present invention.

FIG. 10A is a flow chart showing blocks included in a method for performing phase equalization in accordance with one embodiment of the present invention. The method includes detecting at least one bit pattern on a signal line, which, for example, may be one of a plurality of data bus lines. (B650). A phase-shift value corresponding to the bit pattern is obtained. (B651). A phase-shift setting may be determined based on the phase-shift value (B652). One of a plurality of delayed signals (e.g., clock signals) are selected based on the phase-shift setting. (B653). Transmission of data on the signal line is performed based on the selected one of the delayed signals. (B654). And, inter-symbol interference is suppressed based on this delayed transmission. (B655).

Figure 10B:
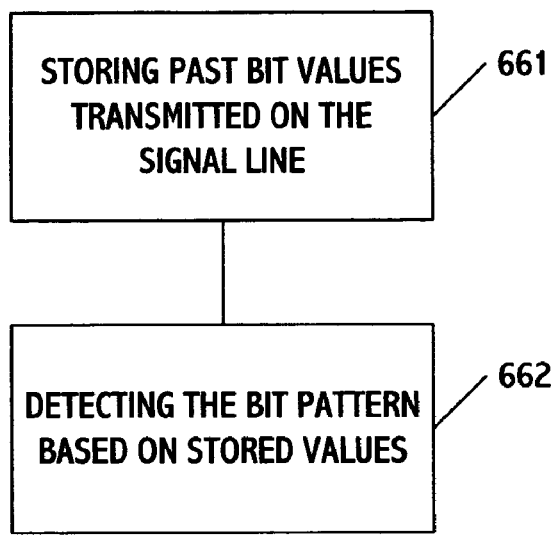
FIG. 10B is a flow chart showing blocks which may be used to detect a bit pattern on a signal line which, for example, may correspond to a data bus line.

FIG. 10B is a flow chart showing blocks which may be used to detect a bit pattern on a signal line which, for example, may correspond to a data bus line. This may be accomplished by storing bit values transmitted on the signal line in, for example, the chain of flip-flops shown in FIG. 2. (B661). The stored values are then analyzed to detect the bit pattern, for example, based on the logic circuits also shown in FIG. 2. (B662).

Figure 10C:
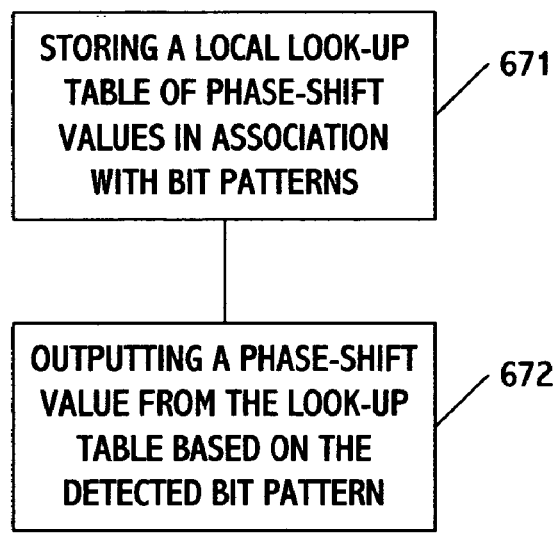
FIG. 10C is a flow chart showing blocks which may be used to obtain phase-shift values in FIG. 10A.

FIG. 10C is a flow chart showing blocks which may be used to obtain phase-shift values in FIG. 10A. These blocks include storing a local look-up table of phase-shift values in association with a respective number of predetermined bit patterns. (B671). A phase-shift value is then output from the local look-up table corresponding to the detected bit pattern. (B672).

Figure 10D:
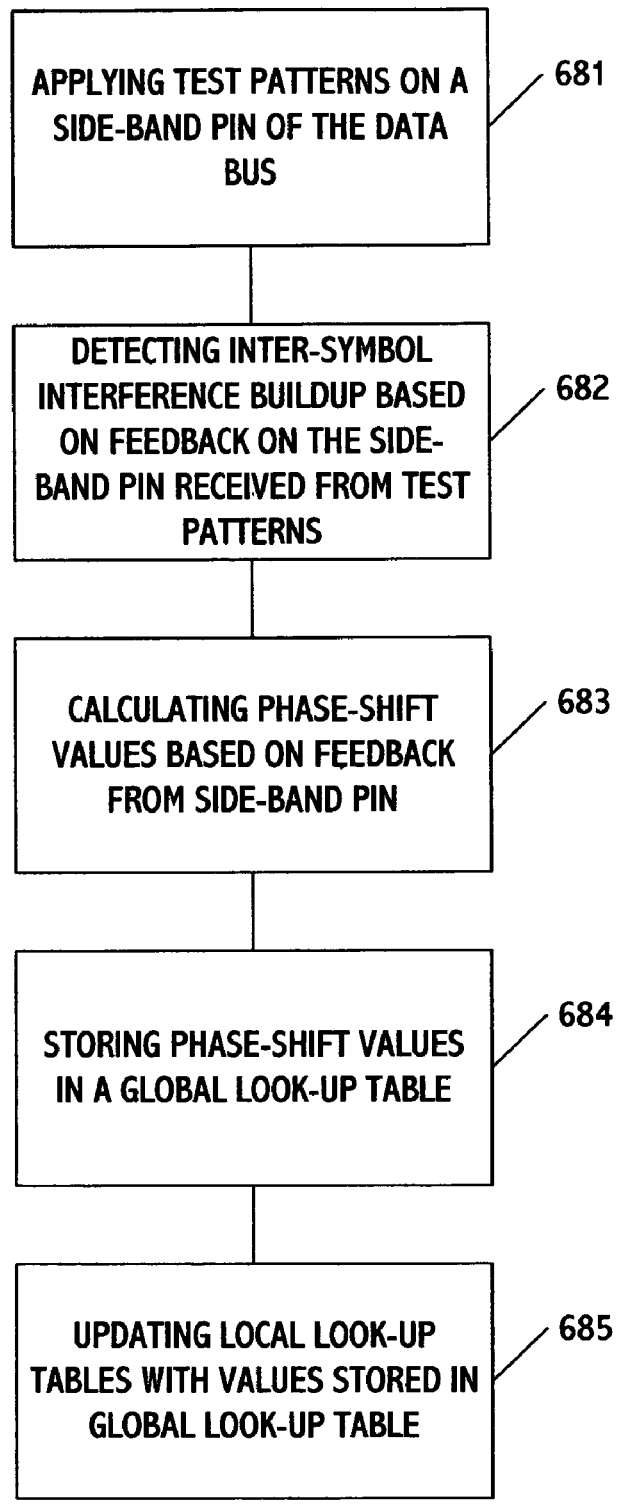
FIG. 10D is a flow chart showing blocks which may be used to update phase-shift values stored in the local look-up table mentioned in FIG. 10C.

FIG. 10D is a flow chart showing blocks which may be used to update phase-shift values stored in the local look-up table mentioned in FIG. 10C. These blocks include applying test patterns on a side-band pin of the data bus. (B681). Inter-symbol interference build-up is detected based on feedback received on the side-band pin in response to the applied test patterns. (B682). Phase-shift values are calculated based on the feedback (B683), and these values are then stored in seriatim in a global look-up table (B684). The local look-up table is then updated with the values stored in the global look-up table. (B685).

Figure 11:
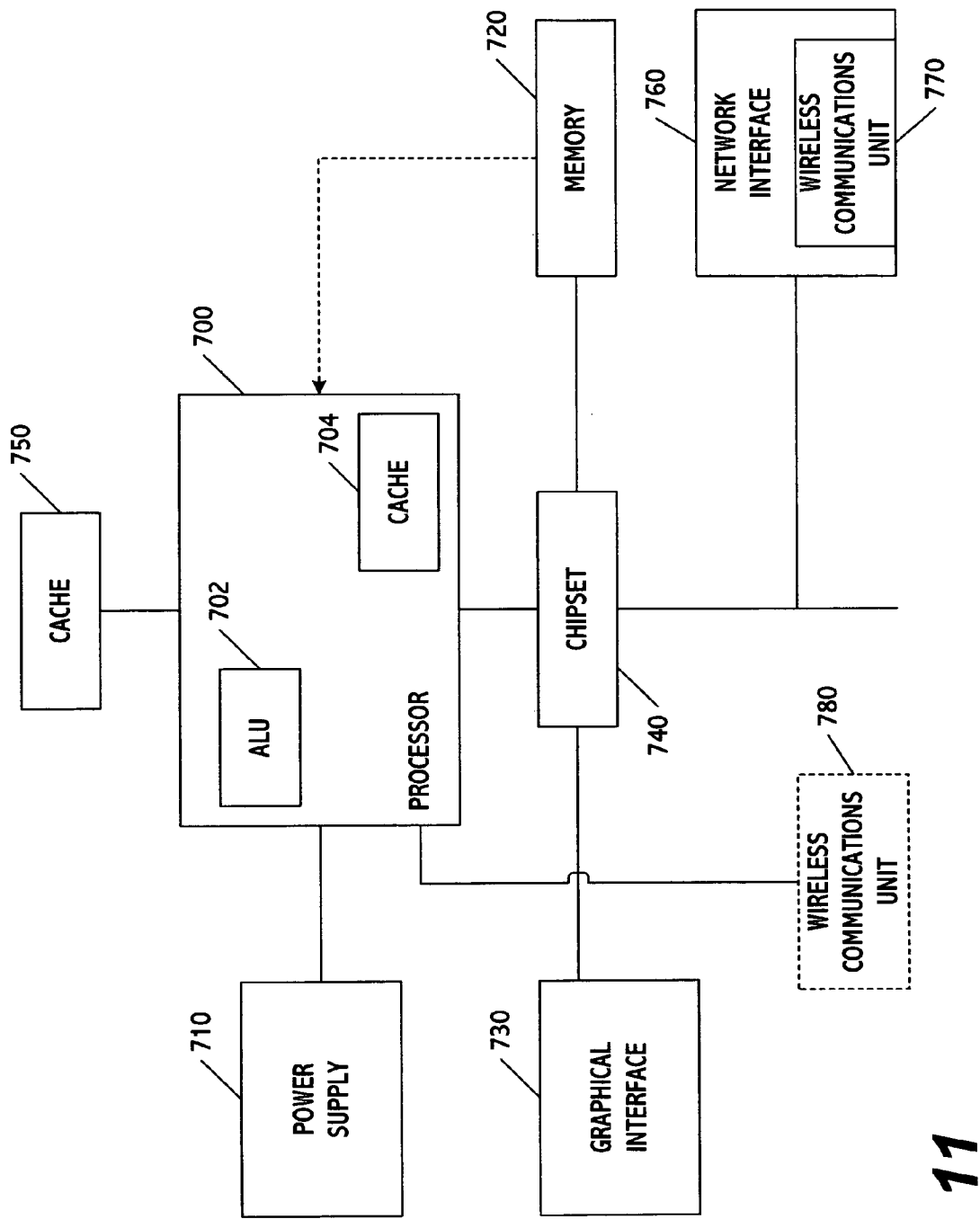
FIG. 11 is a diagram showing a processing system which may include any one or more of the embodiments of the phase equalization circuit and side-band equalization circuit.

FIG. 11 shows a system which includes a processor 700, a power supply 710, and a memory 720 which, for example, may be a random-access memory. The processor includes an arithmetic logic unit 702 and an internal cache 704. The system may also include a graphical interface 730, a chipset 740, a cache 750, a network interface 760, and a wireless communications unit 770, which may be incorporated within the network interface. While these additional circuits are shown as residing outside the processor block, in alternative embodiments one or more of these circuits may reside on the same chip as the processor, which, for example, may be a microprocessor. In these instances, the associated connections would also be included on chip. Also, alternatively or additionally, a wireless communications unit 780 may be coupled to or included on chip with the processor, and a direct connection may exist between memory 720 and the processor as well. Further, the power supply may be a battery in one embodiment and an AC/DC converter in another embodiment.

An equalization circuit in accordance with any of the embodiments of the present invention may be used on any GTL front-side bus. In FIG. 11, the processor and the chipset may communicate on a bus and transceiving entities, each equipped with communicating equalization circuits.

The processor may be a microprocessor or any other type of processor, and may be included on a chip die with all or any combination of the remaining features, or one or more of the remaining features may be electrically coupled to the microprocessor die through known connections and interfaces. Also, the connections that are shown are merely illustrative, as other connections between or among the elements depicted may exist depending, for example, on chip platform, functionality, or application requirements.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An equalization circuit, comprising:
    a circuit to store information indicative of a plurality of phase-shift values corresponding to respective ones of a plurality of predetermined bit patterns;
    a first detector to detect at least one bit pattern on a signal line; and
    a transmit offset circuit to determine a phase-shift setting based on one of the phase-shift values corresponding to the bit pattern detected by the first detector, the phase-shift setting to control a delay in transmission of data on the signal line to help reduce inter-symbol interference, the equalization circuit further comprising a setting circuit to set the phase-shift values based on inter-symbol interference build-up on the signal line.

2. The circuit of claim 1, wherein the first detector includes:
a plurality of storage circuits to store respective values of past bits transmitted on the signal line; and
at least one logic circuit to detect the bit pattern based on the values stored in at least some of the storage circuits.

3. The circuit of claim 1, wherein the transmit offset circuit is to select one of a plurality of different delayed signals based on the phase-shift setting, the selected delayed signal to control the delay in transmission of the data on the signal line.

4. The circuit of claim 3, wherein the different delayed signals are clock signals delayed by different amounts of time.

5. The circuit of claim 3, further comprising:
a latch to output the data for transmission on the signal line based on the selected delayed signal.

6. The circuit of claim 1, wherein the phase-shift setting corresponds to the phase-shift value, that corresponds to the detected bit pattern.

7. The circuit of claim 1, wherein the phase-shift setting is different from the phase-shift value corresponding to the detected bit pattern.

8. The circuit of claim 7, wherein the phase-shift selling is based on the phase-shift value adjusted based on a default clock setting value.

9. The circuit of claim 1, wherein the signal line forms a bit line in a data bus.

10. The circuit of claim 9, wherein the data bus is coupled to a microprocessor.

11. The circuit of claim 1, further comprising:
a second detector to detect the inter-symbol interference build-up on the signal line, the setting circuit to set the phase-shift values based on the inter-symbol interference build-up detected by the second detector.

12. The circuit of claim 1, wherein the first detector is different from the second detector.

13. An equalization circuit, comprising:
a circuit to associate a plurality of phase-shift values with a plurality of predetermined bit patterns;
an adaptive circuit to set the phase-shift values in the associating circuit based on inter-symbol interference build-up on a signal line;
a detector to detect at least one bit pattern on the signal line; and
a transmit offset circuit to determine a phase-shift setting corresponding to the bit pattern detected by the detector, wherein:
the adaptive circuit is to determine the inter-symbol interference build-up on the signal line by applying test patterns to another signal line,
the associating circuit is to output a phase shift-value corresponding to the bit pattern detected by the detector and the transmit offset circuit is to determine the phase-shift setting based on the phase-shift value output from the associating circuit, and
the phase-shift setting is to control a delay in transmission of data on the signal line to help reduce inter-symbol interference.

14. The circuit of claim 13, wherein said another signal line is coupled to a side-band pin of a data bus which includes the signal line.

15. The circuit of claim 13, wherein the adaptive circuit includes:

a pattern generator to form the test patterns;
an offset calculator to calculate the phase-shift values based on feedback received in response to transmission of the test patterns on said another signal line; and
another circuit to store the phase-shift values calculated by the offset calculator.

16. The circuit of claim 15, wherein said another circuit transmits the phase-shift values for storage to the associating circuit.

17. An equalization circuit comprising:
a first detector to detect at least one bit pattern on a signal line; and
a transmit offset circuit to determine a phase-shift setting corresponding to the bit pattern detected by the first detector, the phase-shift setting to control a delay in transmission of data on the signal line to help reduce inter-symbol interference, said equalization circuit further comprising:
centering controller to determine a window of clock offset values, wherein one of the clock offset values corresponds to the phase-shift setting for the bit pattern detected by the detector, and
a setting circuit to set the phase-shift setting based on inter-symbol interference build-up on the signal line.

18. The equalization circuit of claim 17, further comprising:
a second detector to detect the inter-symbol interference build-up on the signal line, the setting circuit to set the phase-shift setting based on the inter-symbol interference build-up detected by the second detector.

19. The circuit of claim 18, wherein the first detector is different from the second detector.

20. A method for controlling equalization in a transmission line, comprising:
storing information indicative of phase-shift values corresponding to respective ones of a plurality of predetermined bit patterns;
detecting, by using a detector, at least one bit pattern on a signal line;
determining a phase-shift setting based on one of the phase-shift values which corresponds to the detected bit pattern; and
controlling a delay in transmission of data on the signal line based on the phase-shift setting, said transmission delay to help reduce inter-symbol interference, said method further comprising:
detecting inter-symbol interference build-up on the signal line; and
setting the phase-shift values in based on the detected inter-symbol interference build-up.

21. The method of claim 20, wherein detecting the at least one bit pattern includes:
storing respective values of past bits transmitted on the signal line; and
detecting the bit pattern based on at least some of the stored values of past bits.

22. The method of claim 20, wherein controlling includes:
selecting one of a plurality of different delayed signals based on the phase-shift setting, the selected delayed signal is to control the delay in transmission of the data on the signal line.

23. The method of claim 20, wherein the phase shift value are stored in the look-up table.

24. The method of claim 20, wherein detecting inter-symbol interference build-up includes:

applying test patterns to another signal line; and detecting the inter-symbol interference build-up based on feedback received on said another signal line in response to the applied test patterns.

25. The method of claim 24, wherein said another signal line is coupled to a side-band pin of a data bus which includes the signal line.

26. The method of claim 24, further comprising:

calculating the phase-shift values based on the feedback received on said another signal line; and storing the phase-shift values in another look-up table as the phase-shift values are calculated.

27. The method of claim 26, further comprising:

loading the phase-shift values in said another look-up table into the look-up table when after a predetermined number of the phase-shift values have been calculated.

28. The method of claim 20, further comprising:

centering a window of clock offset values, wherein one of the clock offset values corresponds to the phase-shift setting corresponding to the detected bit pattern.

29. The method of claim 20, wherein the phase-shift setting corresponds to the phase-shift value, that corresponds to the detected bit pattern.

30. The method of claim 20, wherein the phase-shift setting is different from the phase-shift value corresponding to the detected bit pattern.

31. The method of claim 20, wherein the signal line forms a bit line in a data bus.

32. A system, comprising:

a first circuit; and a second circuit including an equalization circuit having:

(a) a circuit to store information indicative of a plurality of phase-shift values corresponding to respective ones of a plurality of predetermined bit patterns;

(b) a detector to detect at least one bit pattern on a signal line coupled between the first and second circuits; and (c) a transmit offset circuit to determine a phase-shift setting based on one of the phase-shift values corresponding to the bit pattern detected by the detector, the phase-shift setting to control a delay in transmission of data on the signal line to help reduce inter-symbol interference, the equalization circuit further comprising a setting circuit to set the phase-shift values based on inter-symbol interference build-up on the signal line.

33. The system of claim 32, wherein the first and second circuits are selected from the group consisting of a processor, a cache, a power supply, a graphical interface, an arithmetic logic unit, a chipset, a memory, a network interface, and a wireless communications unit.

34. The system of claim 32, wherein the first circuit is coupled to a battery.

35. The system of claim 32, wherein the phase-shift setting corresponds to the phase-shift value corresponding to the detected bit pattern.

36. The system of claim 32, wherein the phase-shift setting is different from the phase-shift value corresponding to the detected bit pattern.

* * * * *

UNITED STATES PATENT AND TRADEMARK OFFICE
CERTIFICATE OF CORRECTION

PATENT NO. : 7,590,173 B2  Page 1 of 1
APPLICATION NO. : 11/169569
DATED : September 15, 2009
INVENTOR(S) : Low et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1095 days.

Signed and Sealed this

Twenty-first Day of September, 2010

David J. Kappos
*Director of the United States Patent and Trademark Office*